July 20, 1954
A. RAPPL
2,684,108
ADJUSTABLE SEAT
Filed Feb. 6, 1948
2 Sheets-Sheet 1
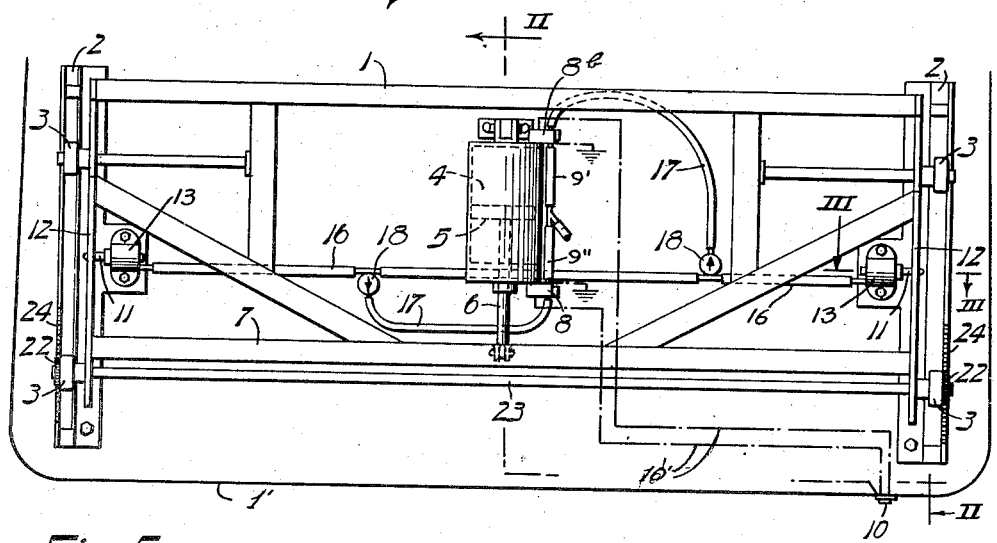
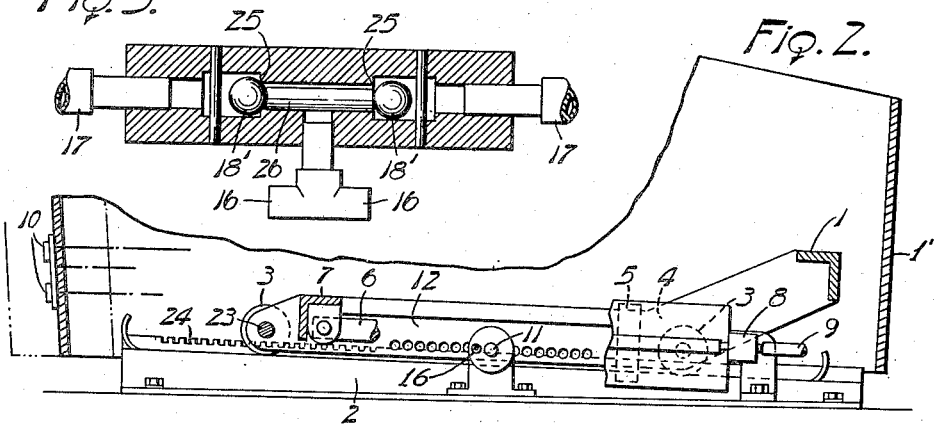
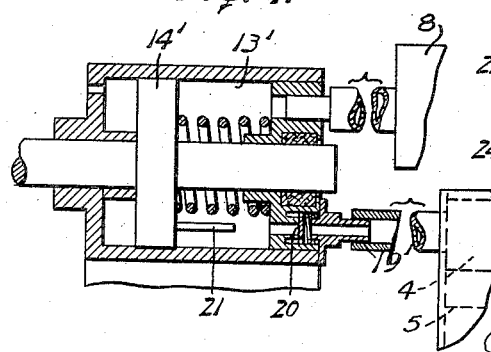
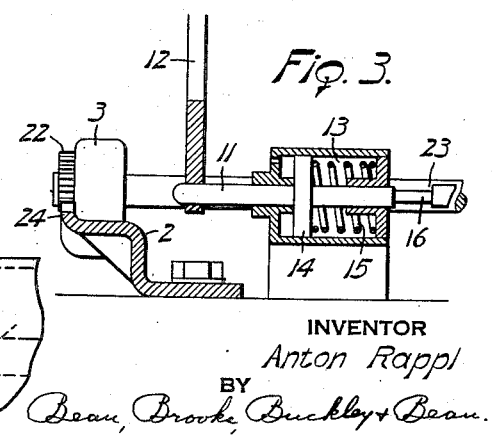
INVENTOR
Anton Rappl
BY
Bean, Brook, Buckley & Bean.
ATTORNEYS

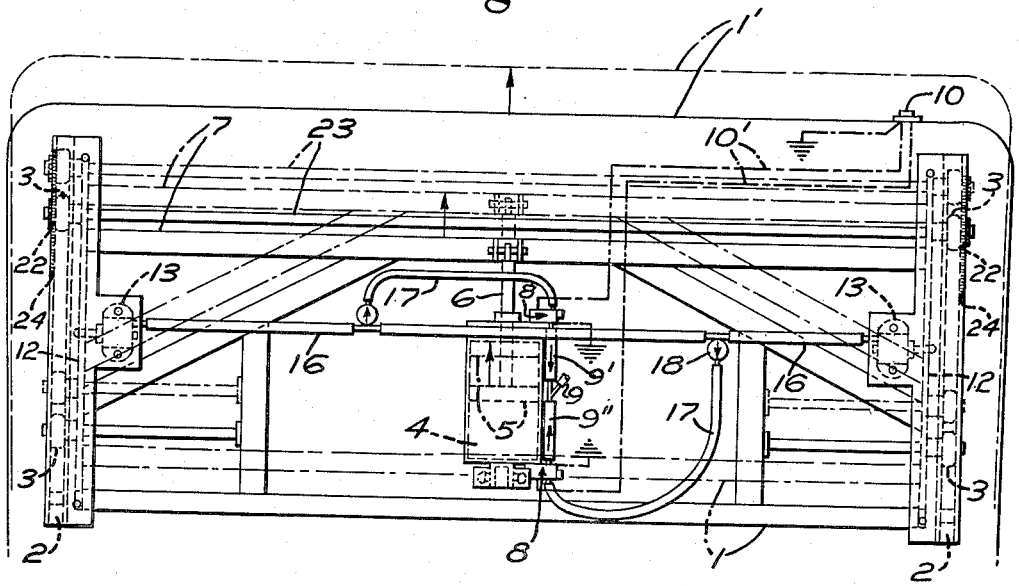

Patented July 20, 1954

2,684,108

UNITED STATES PATENT OFFICE 2,684,108

ADJUSTABLE SEAT

Anton Rappl, Eggertsville, N. Y., assignor to Trico Products Corporation, Buffalo, N. Y.

Application February 6, 1948, Serial No. 6,712

6 Claims. (Cl. 155—14)

This invention relates to adjustable seats and especially to the seats of automobiles and other motor vehicles. Seats of this general type have heretofore been proposed to enable the driver of the vehicle to adjust himself properly to the controls of the same. The seat adjusting mechanisms have relied largely upon manual effort to secure the seat in a given position and therefore have been subject to human failure.

The aim of the present invention is to provide an improved fore and aft seat adjusting mechanism which will be automatic in its action as well as in its securement of the given adjustment.

Further, the invention has for its object to provide a vehicle seat which may readily be adjusted to the desired position and be secured therein with the least effort on the part of the motorist.

Again, the invention resides in an improved seat adjusting mechanism of a practical and simple nature and sturdy in construction.

The foregoing and other objects will manifest themselves as this description progresses, wherein reference is made to the accompanying drawing in which Fig. 1 is a plan view of the seat with the seat cushion removed;

Fig. 2 is a sectional view showing the seat and seat adjusting structure, with parts broken away for greater clarity;

Fig. 3 is a detail sectional view of the automatic seat latch on line III—III of Fig. 1;

Fig. 4 is a detail view through a modified latch construction;

Fig. 5 is a modified check valve unit;

Fig. 6 is an enlarged sectional detail view of one of the electromagnetic motor control valves showing its connections to the motor and to the suction line; and Fig. 7 is a bottom plan view of the seat of Fig. 1, showing the same in two positions of adjustment.

Referring more particularly to the drawing, the numeral 1 designates the substructure of the cushioned seat 1' which substructure is slidably mounted for fore and aft adjustment upon the parallel supporting rails 2 with antifriction rollers 3 therebetween.

A fluid motor is illustrated herein for providing the motive power to effect the seat adjustment, such motor having a chamber 4 and a piston 5. The piston rod 6 joins the piston to a transverse frame member 7 of the seat substructure while the motor chamber is anchored with respect to the seat supporting rails 2. An electromagnetic valve 8 is provided at each end of chamber 4 for alternatively opening the respective ends of the motor chamber to the suction line 9 through lines 9' and 9", which suction line may lead to the engine intake manifold as a vacuum producing means. These valves 8 each have a suction port 8' communicating with supply line 9, an atmospheric port 8", and a valve element 8''' normally closing the suction port but movable to open the suction port and close the opposing atmospheric port. The valve chamber between valve element 8''' and atmospheric port 8" communicates with chamber 4 and a passage 17, as shown in Fig. 6. A readily accessible control switch 10 is connected in an electric circuit including leads 10' with the electromagnetic valves for selectively opening either to effect the desired suction communication with the corresponding end of the motor chamber while the opposite end of the chamber, which latter is normally opened to the atmosphere through port 8", will admit air at higher pressure and create the necessary pressure differential for adjusting the seat.

As clearly illustrated in Fig. 6, each of valves 8 includes an electromagnetic 50 and a suction passage 51 communicating with suction line 9" and opening into a chamber 52 in which operates a small piston 53. A spring 25 urges piston 53 toward one end of chamber 52 in a direction seating valve 8''' to close suction port 8'. Valve 8''' operates in a chamber 32 between ports 8' and 8", and closes the latter when it opens the former. Normally motor chamber 4 is vented to the atmosphere through passage 34 opening into chamber 32, and a filter 35 is provided to filter the inflowing airstream. Chamber 52 beneath piston 53 is vented to the atmosphere through a port 36 and a wall passage 38, port 36 being normally closed by a valve disk 37 acting under pressure differential.

Upon energizing magnet 50, valve 37 is attracted to open port 36 and thereby establish a pressure differential on piston 53 to move it against the action of spring 25. This movement of piston 53 causes valve 8''' to open port 8' and close port 8", whereupon the associated conduit 17 and the associated end of chamber 4 are subjected to a suction influence. A valve 28 having a knob 29 and a beveled wall 30 is arranged in passage 51 to regulate the movement of piston 53, a second position of valve 28 being shown in broken lines.

One or more latches 11 are provided, each to engage in one of a series of recesses on a respective lock bar or keeper 12 and thereby secure the seat in its adjusted position. Each latch is placed under the control of the seat adjustment control 10 and, in the illustrated embodiment, is responsive to the pressure differential in the seat adjusting motor. Therefore, each latch has an auxiliary motor in the form of a chamber 13 and a piston 14, the latter being connected to the latch 11 and urged outwardly by a spring 15 to engage the latch with its keeper 12. The chamber 13 has communication with both ends of the primary motor chamber 4 through a conduit 16 and branch passages 17. Each branch passage has a conventional check valve 18 which insures unidirectional air flow therethrough.

When a control switch 10 is closed the corresponding valve 8 will open the suction line to the primary motor and, through its branch passage 17 and conduit 16, will also cause evacuation of both auxiliary motor chambers 13 to retract the latches 11. The seat holding latches 11 are fully retracted prior to seat adjusting operation of the primary motor by reason of the fact that chambers 13 are much smaller in size than chamber 4, as is clearly illustrated in Fig. 1. Thus, chambers 13 will be evacuated prior to evacuation of chamber 4, and pistons 14 will be moved to retract latches 11 before piston 5 is moved to adjust seat 1'. Also, the auxiliary motors have a relatively light load, as compared with the load on the primary motor, and thus pistons 14 will move in response to a lesser degree of pressure differential than will piston 5. These two factors, the difference in air storage capacity and the difference in load, result in retraction of latches 11 before operation of the primary motor. It will be appreciated that the latch retracting motors are designed to operate in the space of a few fractions of a second.

To insure full retraction of the seat holding latches preliminary to seat adjusting operation of the primary motor, the auxiliary motors can be arranged to control vacuum communication between valves 8 and chamber 4, as shown in Fig. 4. In this arrangement, wherein valve 8, chamber 4 and piston 5 are shown schematically, a vacuum passage 19 extends from electromagnetic valve 8 into auxiliary motor chamber 13', and there is no direct vacuum passage between valve 8 and chamber 4. A second vacuum passage 19', forming a continuation of passage 19, extends between chambers 13' and 4. Passage 19' is normally closed by a spring pressed valve 20, but is opened by a stem 21 carried by piston 14' when said piston has been moved to retract latch 11. The translatory movement of the seat along the rails may be insured by having the pinions 22 which are fixed to the cross shaft 23 meshing with the teeth of the parallel rack bars 24.

When the control switch 10 is released and the seat adjusting motor 4, 5 is opened at both ends to the atmosphere, the vacuum in the latch line 16, 17 will be dissipated through air leakage around the pistons 14. Since piston 14 is not provided with packing, there will exist a minute amount of leakage therearound. This leakage is small enough, and the source of vacuum is strong enough, that it does not interfere with retraction of piston 14 when switch 10 is actuated. The load on the auxiliary motor is sufficiently light that only a relatively low pressure differential is required to retract piston 14. However, upon releasing switch 10, this minute air leakage will quickly dissipate the vacuum in chamber 13 and lines 16 and 17 sufficiently to permit spring 15 to move piston 14.

A modified check valve arrangement is provided wherein instead of the two check valves 18 being independent of each other, they may be interrelated, as shown in Fig. 5 wherein is illustrated a pair of ball valves 18' designed to engage seats 25, but the engagement will be confined to a single valve by reason of an interposed spacer 26 of sufficient length to prevent both check valves seating simultaneously. When one end of the cylinder 4 is connected to the source of suction, that negative pressure will also be maintained in the corresponding branch conduit 17 to unseat its valve 18' and to draw the opposite valve 18' to its seat 25 and against the spacer 26. The unseated valve 18' will permit this suction to act on the latches 11 through the common passage 16 while the seated check valve 18' will serve to prevent air in the other conduit 17 from entering passage 16. Consequently, one check valve will always be unseated and therefore when the control 10 is released and the seat adjusting motor is vented to the atmosphere the atmospheric pressure will also enter the connecting passage 16 to vent the latch motor chambers 13. This will avoid the necessity of providing any bleed to insure proper and prompt functioning of the seat latches.

The complete operation of this invention is as follows. When at rest, both sides of chamber 4 are exposed to the atmosphere through the atmospheric port 8" in each valve 8, and latches 11 engage the recesses in keepers 12 under the influence of springs 15. If it is desired to move the seat forwardly, for example, the appropriate switch 10 is closed to energize the forward electromagnetic valve 8, which is the lower one of said valves in Fig. 1. When energized, valve element 8''' of this valve is moved in the manner described to open suction port 8' and close atmospheric port 8". Thus, the lower end of chamber 4 as viewed in Fig. 1, is subjected to vacuum through suction port 8' and supply line 9, with the upper end of chamber 4 remaining open to the atmosphere. Thus, a pressure differential begins to build up in chamber 4 tending to move piston 5 forwardly. At the same time, the inner side of the chamber 13 in each of the auxiliary motors is subjected to vacuum through the conduit 17 associated with the energized valve 8, its corresponding check valve 18, and conduit 16, conduit 16 being a continuous conduit interconnecting chambers 13. The other check valve 18 prevents air from passing through its associated conduit 17 to conduit 16. In this way, a pressure differential is created in each of the auxiliary motors to retract latches 11. For the reasons previously given, latches 11 will be retracted before the primary motor begins to operate.

When it is desired to move the seat rearwardly, the upper valve, as viewed in Fig. 1, is energized, and vacuum passes through its associated conduit 17 and check valve 18. The other check valve 18 then prevents air from entering conduit 16 through the lower conduit 17.

The seat adjustment and lock therefore is responsive solely to the single control 10. The seat securement is automatic with the functioning or non-functioning of the seat adjusting motor. The latch is released upon stoppage of the seat adjusting motor, and its retraction is effected by and from the electromagnetic valve. While the foregoing description has been given in detail it is apparent that the inventive principles involved are capable of assuming other physical embodiments without departing from the spirit of the invention and the scope of the appended claims.

What is claimed is:

1. An adjustable seat for vehicles, comprising a supporting structure, a seat structure slidable thereon fore and aft, a fluid motor having a chamber with a piston therein, one of the motor elements being connected to the supporting structure and the other to the seat structure, valve means selectively connecting either end of the motor chamber to a pressure reducing source and normally venting both ends of the motor chamber to the atmosphere, spaced latch means for holding the seat structure normally arrested and each latch means including a fluid motor connected by a conduit to a respective end of the seat adjusting motor, and check valve means connected to said conduits for confining the fluid flow through the conduits to a single direction.

2. An adjustable seat for vehicles, comprising a supporting structure, a seat structure slidable thereon fore and aft, a fluid motor having a chamber with a piston therein, one of the motor elements being connected to the supporting structure and the other to the seat structure, valve means selectively connecting either end of the motor chamber to a source of reduced pressure and normally venting both ends of the motor chamber to the atmosphere, spaced latch means for holding the seat structure normally arrested and each latch means including a fluid motor connected by a conduit to a respective end, and check valve means interposed in the conduits and including oppositely facing valve seats with a valve cooperating with each seat and means precluding the seating of both valves concurrently whereby the venting of the seat adjusting motor will also vent the latch motors.

3. An adjustable seat for vehicles, comprising a supporting structure, a seat structure slidable thereon fore and aft, a fluid motor having a chamber with a piston therein, one of the motor elements being connected to the supporting structure and the other to the seat structure, valve means selectively connecting either end of the motor chamber to a pressure reducing source, and latch means for holding the seat structure normally arrested, said latch means including spaced fluid motors each connected by a conduit to a respective end of the seat adjusting motor.

4. An adjustable seat for vehicles, comprising a supporting structure, a seat structure slidable thereon fore and aft, a fluid motor having a chamber with a piston therein, one of the motor elements being connected to the supporting structure and the other to the seat structure, valve means selectively connecting either end of the motor chamber to a pressure reducing source, and latch means for the seat structure including a second motor chamber with a fluid responsive spring returned member acting normally to hold the seat structure arrested, and means responsive to the reduced pressure in one end of the first motor chamber for placing said one end in communication with the second motor chamber to the exclusion of the opposite end of the first motor for freeing the seat structure.

5. An adjustable seat for vehicles, comprising a supporting structure, a seat structure slidable thereon fore and aft, a fluid motor having a chamber with a piston therein, one of the motor elements being connected to the supporting structure and the other to the seat structure, first valve means selectively connecting either end of the motor chamber to an operating pressure producing means, latch means for holding the seat structure arrested and including a second fluid motor connected by branch passage means to the opposite ends of the first fluid motor, and second valve means responsive to the operating pressure for closing off the branch passage connection to the non-selected end of the first fluid motor.

6. An adjustable seat for vehicles, comprising a supporting structure, a seat structure slidable thereon, a fluid motor for so sliding the seat structure to effect seat adjustment, valve means operatively connecting the fluid motor to a pressure reducing source to energize said motor, spring actuated latch means to hold the seat structure normally arrested, and an auxiliary fluid motor operatively connected to the source by said valve means for retracting the latch means to free the seat structure for adjustment.

References Cited in the file of this patent
UNITED STATES PATENTS

| Number | Name | Date |
|--------|------|------|
| 2,242,247 | Grant | May 20, 1941 |
| 2,283,761 | Richter | May 19, 1942 |
| 2,432,895 | Horton | Dec. 16, 1947 |